(12) United States Patent
Jasinkiewicz et al.

(10) Patent No.: US 8,959,898 B2
(45) Date of Patent: Feb. 24, 2015

(54) REGENERATION METHODS AND SYSTEMS FOR PARTICULATE FILTERS

(75) Inventors: Paul Jasinkiewicz, Northville, MI (US); Rebecca J. Darr, Milford, MI (US); James M. Perrin, Livonia, MI (US); Steve L. Melby, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 974 days.

(21) Appl. No.: 13/094,164

(22) Filed: Apr. 26, 2011

(65) Prior Publication Data

US 2012/0272638 A1 Nov. 1, 2012

(51) Int. Cl.

| | |
|---|---|
| *F01N 3/00* | (2006.01) |
| *F01N 3/10* | (2006.01) |
| *F01N 3/02* | (2006.01) |
| *F02D 41/02* | (2006.01) |
| *F01N 9/00* | (2006.01) |
| *F02D 41/40* | (2006.01) |
| *F01N 3/025* | (2006.01) |
| *F01N 13/00* | (2010.01) |

(52) U.S. Cl.
CPC ............ *F01N 3/103* (2013.01); *F02D 41/029* (2013.01); *F01N 9/002* (2013.01); *F02D 41/405* (2013.01); *F01N 3/0253* (2013.01); *F01N 13/009* (2013.01); *Y02T 10/47* (2013.01); *F01N 2430/085* (2013.01); *Y02T 10/44* (2013.01)
USPC ................. 60/295; 60/274; 60/285; 60/286; 60/297; 60/303; 60/311

(58) Field of Classification Search
CPC ....... F01N 3/0253; F01N 3/103; F01N 9/002; F01N 2430/085; F02D 41/029; F02D 41/405; Y02T 10/44; Y02T 10/47

USPC ........... 60/274, 276, 285, 286, 295, 297, 303, 60/311
See application file for complete search history.

(56) References Cited

U.S. PATENT DOCUMENTS

| | | | | |
|---|---|---|---|---|
| 8,322,130 | B2 * | 12/2012 | Yuza et al. ..................... | 60/286 |
| 8,336,296 | B2 * | 12/2012 | Nakatani et al. ............... | 60/286 |
| 2004/0204289 | A1 | 10/2004 | Inoue et al. | |
| 2010/0205943 | A1 | 8/2010 | Gonze et al. | |
| 2010/0307132 | A1 | 12/2010 | Yuza et al. | |

FOREIGN PATENT DOCUMENTS

| | | |
|---|---|---|
| CN | 101389835 A | 3/2009 |
| EP | 1617059 A1 | 1/2006 |
| WO | 2005049985 A1 | 6/2005 |

OTHER PUBLICATIONS

CN Office Action dated Mar. 12, 2014 for CN Patent Application No. 201210125536.7; 6 pages.

* cited by examiner

*Primary Examiner* — Thomas Denion
*Assistant Examiner* — Diem Tran
(74) *Attorney, Agent, or Firm* — Cantor Colburn LLP

(57) ABSTRACT

A method of regenerating a particulate filter of an exhaust system is provided. The method includes determining a first regeneration mode based on a soot level; generating control signals to a first fuel injector associated with an engine based on the first regeneration mode; determining a second regeneration mode based on the soot level; and generating control signal to a second fuel injector associated with an exhaust stream of the exhaust system based on the second regeneration mode.

15 Claims, 3 Drawing Sheets

REGENERATION METHODS AND SYSTEMS FOR PARTICULATE FILTERS

FIELD OF THE INVENTION

The subject invention relates to methods and systems for regenerating a particulate filter, and more particularly to methods and systems for regenerating a particulate filter based on a multi-mode regeneration process.

BACKGROUND

Exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("NOx") as well as condensed phase materials (liquids and solids) that constitute particulate matter. Catalyst compositions typically disposed on catalyst supports or substrates are provided in an engine exhaust system to convert certain, or all of these exhaust constituents into non-regulated exhaust gas components.

Particulate filters remove the particulate matter from the exhaust gas. The particulate matter accumulates within the particulate filter. Over time, the particulate filter becomes full and the trapped particulates must be removed. The trapped particulates are typically removed through a regeneration process that burns the particulates within the particulate filter. In some cases, if the heat from the regeneration process is too high, the particulate filter may become damaged.

Accordingly, it is desirable to provide methods and systems for selectively regenerating the particulate filter such that damage to the particulate filter does not occur.

SUMMARY OF THE INVENTION

In one exemplary embodiment, a method of regenerating a particulate filter of an exhaust system is provided. The method includes determining a first regeneration mode based on a soot level; generating control signals to a first fuel injector associated with an engine based on the first regeneration mode; determining a second regeneration mode based on the soot level; and generating control signal to a second fuel injector associated with an exhaust stream of the exhaust system based on the second regeneration mode.

In another exemplary embodiment, an exhaust treatment system for an internal combustion engine is provided. The system includes an oxidation catalyst that receives exhaust gas from the internal combustion engine. A particulate filter is disposed downstream of the oxidation catalyst and receives the exhaust gas from the internal combustion engine. A control module determines a regeneration mode and selectively controls a first fuel injector of the internal combustion engine and a second fuel injector that is external to the internal combustion engine based on the regeneration mode.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
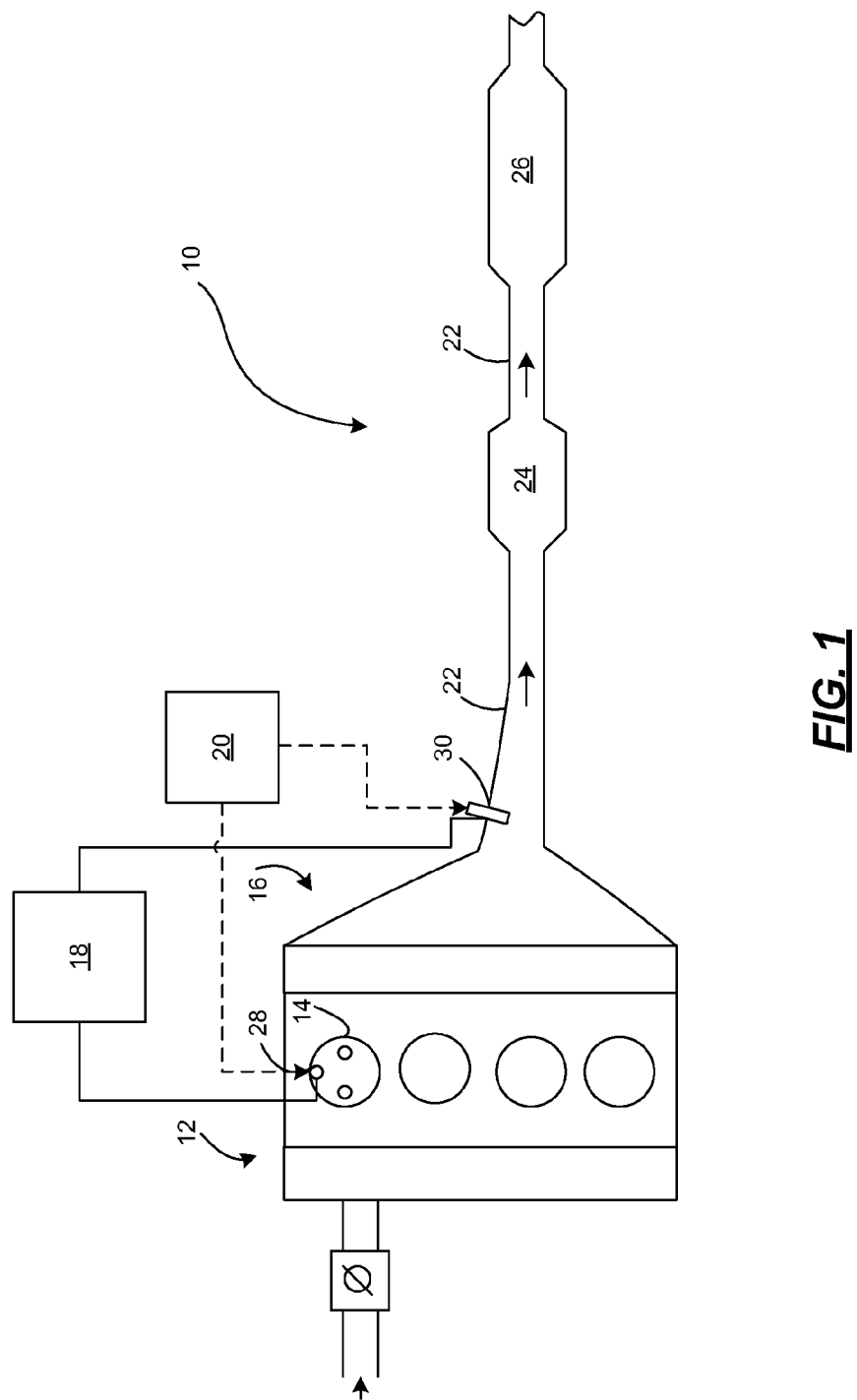
FIG. 1 is a functional block diagram of a vehicle including an exhaust gas treatment system in accordance with exemplary embodiments.

The following description is merely exemplary in nature and is not intended to limit the present disclosure, its application or uses. It should be understood that throughout the drawings, corresponding reference numerals indicate like or corresponding parts and features.

Referring now to FIG. 1, exemplary embodiments of the present invention are directed to an exhaust gas treatment system 10 that reduces exhaust gas constituents of an internal combustion engine 12. It is appreciated that the invention described herein can be implemented in various engine systems that may include, for example, but are not limited to, diesel engines, gasoline direct injection systems and homogeneous charge compression ignition engine systems.

Air is drawn into cylinders 14 of the engine 12 and mixed with fuel. The air/fuel mixture is combusted therein and expelled through an exhaust system 16. In various embodiments, the engine 12 includes four cylinders as shown in FIG. 1. As can be appreciated, the systems and methods of the present disclosure can be implemented in engines having a plurality of cylinders including, but not limited to, 2, 3, 4, 5, 6, 8, 10 and 12 cylinders. A fuel system 18 supplies fuel stored in a fuel storage unit (not shown) to the engine 12. A control module 20 controls the fuel system 18 and/or operations of the diesel engine 12.

The exhaust gas treatment system 10 couples to the exhaust system 16. The exhaust gas treatment system 10 generally includes one or more exhaust conduits 22, and one or more exhaust treatment devices. In various embodiments, the exhaust treatment devices include an oxidation catalyst 24 and a particulate filter 26. As can be appreciated, the exhaust treatment devices can further include, for example, a selective catalytic reduction device (SCR) (not shown), an ammonia slip catalyst (ASC) (not shown), and/or any other exhaust treatment devices arranged in various configurations. For ease of the discussion, the exemplary embodiments provided herein will be discussed in the context of the exhaust gas treatment devices including the oxidation catalyst 24 and the particulate filter 26.

In FIG. 1, the exhaust conduit 22, which may comprise several segments, transports exhaust gas from the engine 12 to the exhaust gas treatment devices. For example, the oxidation catalyst 24 receives exhaust gas from the engine 12. As can be appreciated, the oxidation catalyst 24 can be of various flow-through, oxidation catalysts known in the art. In various embodiments the oxidation catalyst 24 may include a flow-through metal or ceramic monolith substrate that is packaged in a rigid shell or canister having an inlet and an outlet in fluid communication with the exhaust conduit 22. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The oxidation catalyst 24 treats unburned gaseous and non-volatile HC and CO, which are oxidized to form carbon dioxide and water.

The particulate filter 26 may be disposed downstream of the oxidation catalyst 24. Likewise, the particulate filter 26 receives the exhaust gas from the engine 12. The particulate filter 26 operates to filter the exhaust gas of carbon and other particulate matter. As can be appreciated, the particulate filter 26 can be of various particulate filters known in the art. In various embodiments, the particulate filter 26 may be constructed using a wall flow monolith filter or other devices, such as, for example, wound or packed fiber filters, open cell foams, sintered metal fibers, etc.

The trapped particulate matter is removed from the particulate filter 26 through a multi-mode regeneration process. For example, a first regeneration mode operates one or more engine fuel injectors 28 of the engine 12 to inject fuel into one or more of the engine cylinders 14. The fuel is mixed with the exhaust gas as it is released from the cylinder 14. As the exhaust gas travels through the exhaust gas treatment system 10, the HC of the fuel in the exhaust gas is oxidized in the oxidation catalyst 24 causing an exothermic reaction that raises the temperature of the exhaust gas. The heated exhaust gas travels downstream to the particulate filter 26. The heated exhaust gas causes the particulate matter in the particulate filter to ignite and burn as the exhaust gas passes through the particulate filter 26.

A second regeneration mode operates a second fuel injector 30 (hereinafter referred to as an external fuel injector 30) of the exhaust conduits 22 to inject fuel directly into the exhaust stream. As the exhaust gas travels through the exhaust gas treatment system 10, the HC of the fuel in the exhaust gas is oxidized in the oxidation catalyst 24 causing an exothermic reaction that raises the temperature of the exhaust gas. The heated exhaust gas travels downstream to the particulate filter 26. The heated exhaust gas causes the particulate matter in the particulate filter 26 to ignite and burn as the exhaust gas passes through the particulate filter 26.

The control module 20 determines the regeneration mode and generates control signals to control the fuel injectors 28, 30 based on sensed and/or modeled data and further based on the regeneration methods and systems of the present disclosure. In various embodiments, the control module 20 determines the regeneration mode by estimating the level of accumulated particulate matter in the particulate filter 26 (also referred to as the soot level). For example, when the soot level is high, the regeneration mode is the first regeneration mode, to provide exhaust gas mixing characteristics that provide a more uniform burning of the particulate matter. When the soot level falls below a threshold, the regeneration mode is changed to the second regeneration mode, to prevent further dilution of the engine oil (e.g., due to the injection of fuel into the cylinder). Based on the regeneration mode, the control module 20 generates control signals to the engine fuel injectors 28 and the external fuel injector 30 to initiate regeneration.

Figure 2:
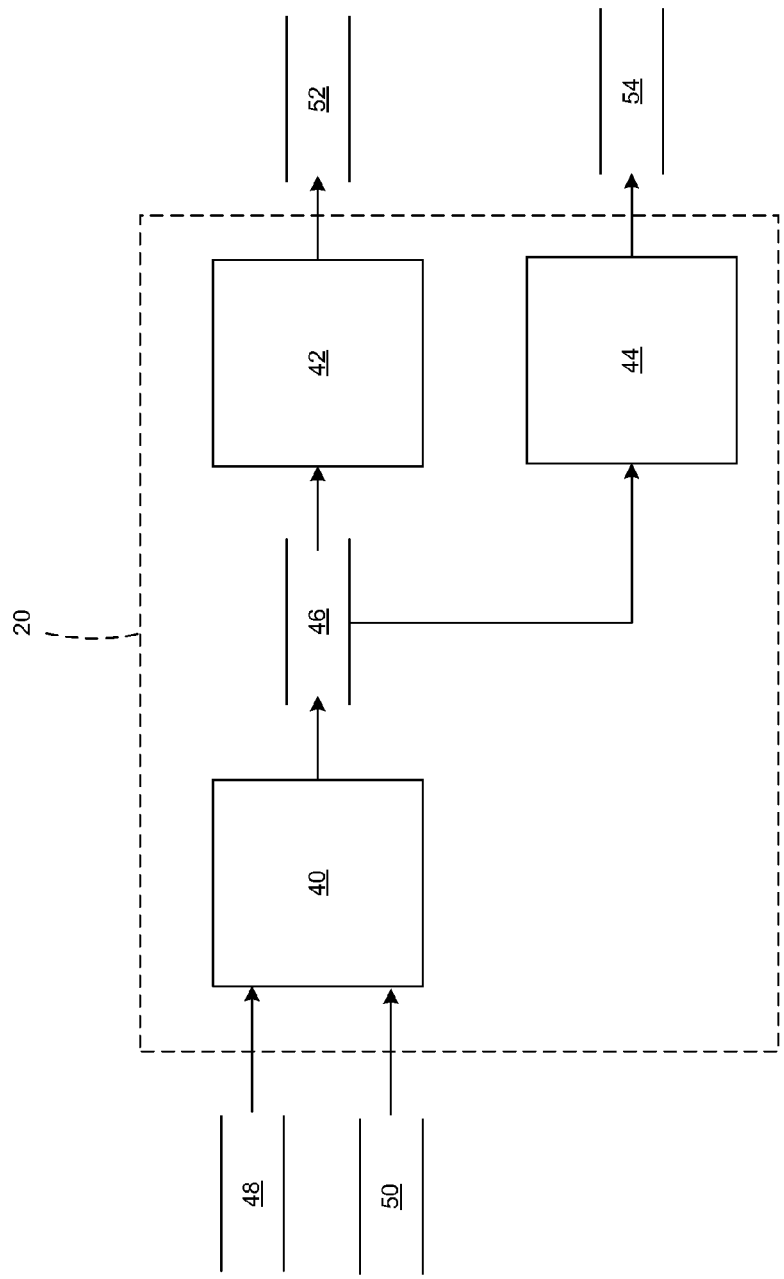
FIG. 2 is a dataflow diagram illustrating a regeneration control system in accordance with exemplary embodiments.

Referring now to FIG. 2, a dataflow diagram illustrates various embodiments of a regeneration control system that may be embedded within the control module 20. Various embodiments of regeneration control systems according to the present disclosure may include any number of sub-modules embedded within the control module 20. As can be appreciated, the sub-modules shown in FIG. 2 may be combined and/or further partitioned to similarly control the regeneration of the particulate filter 26 (FIG. 1). Inputs to the control module 20 may be sensed from the engine 12 (FIG. 1), received from other control modules (not shown), and/or determined/modeled by other sub-modules (not shown) within the control module 20. In various embodiments, the control module 20 includes a mode determination module 40, an in-cylinder injection control module 42, and an external injection control module 44.

The mode determination module 40 determines a regeneration operation mode 46 based on a soot level 48 indicating an estimated level of accumulated particulate matter in the particulate filter 26 (FIG. 1). As can be appreciated, the soot level 48 can be estimated by other modules (not shown) of the control module 20 or by other control modules (not shown) using various estimation methods.

In various embodiments, the regeneration mode 46 can be one of an in-cylinder injection mode and an external injection mode. For example, when the soot level 48 is greater than or equal to a predetermined threshold, the mode determination module 40 sets the regeneration mode 46 to the in-cylinder injection mode. When the soot level 48 is less than the predetermined threshold, the mode determination modules 40 sets the regeneration mode 46 to the external injection mode.

In various embodiments, the mode determination module 40 can determine the regeneration mode 46 when, for example, a request 50 to perform a service regeneration or other type of regeneration is received.

The in-cylinder injection control module 42 receives as input the regeneration mode 46. Based on the regeneration mode 46, the in-cylinder injection control module 42 generates one or more control signals 52 to the engine 12 (FIG. 1) to control injection of fuel into the cylinders 14 (FIG. 1). For example, fuel injector control signals can be generated to the engine fuel injectors 28 (FIG. 1) to control the injection of a determined amount of fuel to a selected cylinder 14, or cylinders (FIG. 1) during a particular point in time of a compression and/or an exhaust stroke of the cylinder 14.

The external injection control module 44 receives as input the regeneration mode 46. Based on the regeneration mode 46, the external injection control module 44 generates one or more control signals 54 to the external fuel injector 30 to control injection of fuel into the exhaust stream. For example, a post injector control signal is generated to the external fuel injector 30 (FIG. 1) to control the injection of a determined amount of fuel to the exhaust stream at a particular time.

In various embodiments, the external injection control module 44 continues to control the injection of the fuel into the exhaust stream until one or more diagnostic algorithms associated with the particulate filter 26 (FIG. 1) and/or regeneration has completed.

Figure 3:
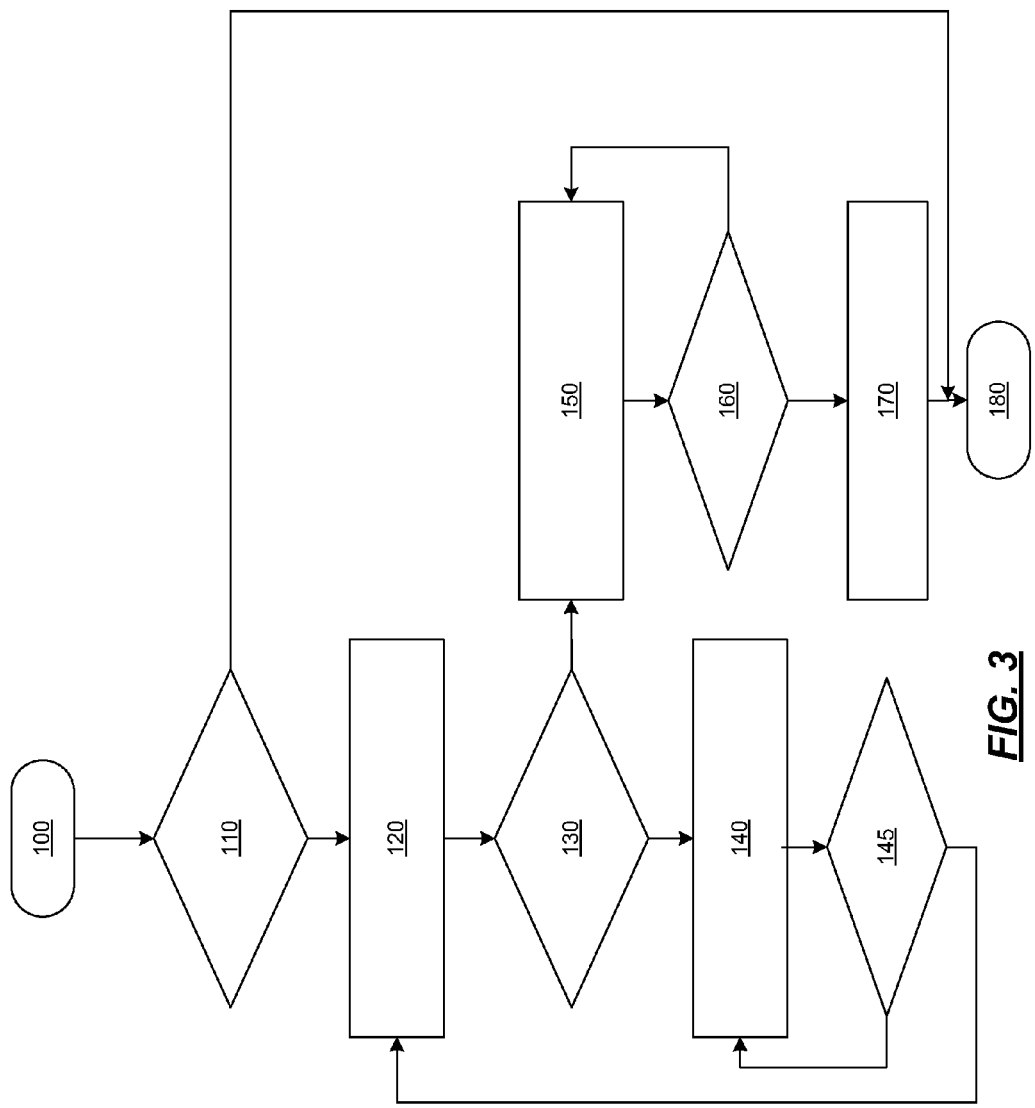
FIG. 3 is a flowchart illustrating a regeneration control method in accordance with exemplary embodiments.

Referring now to FIG. 3, and with continued reference to FIGS. 1 and 2, a flowchart illustrates a regeneration control method that can be performed by the control module 20 of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events, and/or run continually during operation of the engine 12. For example, the method may be run during a service event of the engine 12, where the service event is due to the activation of one or more diagnostic codes.

In one example, the method may begin at 100. A service regeneration mode is initiated at 110. The regeneration mode 46 is determined based on the soot level at 120. If the regeneration mode 46 is the in-cylinder injection mode at 130, control signals 52 are generated to control the injection of fuel into the cylinder 14 at 140. The diagnostics associated with the particulate filter 26 are evaluated at 145. If the diagnostics have not completed at 145, the method continues with the injection of fuel to the cylinder at 140. If the diagnostics have completed at 145, the method continues with determining the regeneration mode 46 at 120.

Once the regeneration mode 46 becomes the external injection mode at 130, control signals 54 are generated to control the injection of fuel into the exhaust stream at 150.

The diagnostics associated with the particulate filter 26 are evaluated at 160. If the diagnostics have not completed at 160, the method continues with the injection of fuel to the exhaust stream at 150. If the diagnostics have completed at 160, the service regeneration is complete at 170. The method may end at 180.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A method of regenerating a particulate filter of an exhaust system, comprising:
   determining a first regeneration mode when a soot level is above a threshold;
   generating control signals to a first fuel injector associated with an engine based on the first regeneration mode;
   determining a second regeneration mode when the soot level is below the threshold; and
   generating a control signal to a second fuel injector associated with an exhaust stream of the exhaust system based on the second regeneration mode,
   wherein the particulate filter of the exhaust system is regenerated based on the generated control signal or signals.

2. The method of claim 1, wherein the generating control signals to a first fuel injector further comprises generating control signals to a plurality of fuel injectors to inject fuel into cylinders of the engine based on the first regeneration mode.

3. The method of claim 1, wherein the second fuel injector injects fuel into an exhaust conduit of the exhaust system.

4. The method of claim 1, wherein the soot level is an estimated level of particulate matter in the particulate filter.

5. The method of claim 1, wherein the generating the control signal is based on a completion of one or more diagnostic algorithms.

6. The method of claim 1, wherein the determining the first regeneration mode, the generating the control signals to the first fuel injector, the determining the second regeneration mode, and the generating the control signal to the second fuel injector are performed during a service regeneration event.

7. The method of claim 1, wherein the first fuel injector injects fuel into a cylinder of the engine.

8. The method of claim 7, wherein the second fuel injector injects fuel into an exhaust conduit of the exhaust system.

9. An exhaust gas treatment system for an internal combustion engine, comprising:
   an oxidation catalyst that receives exhaust gas from the internal combustion engine;
   a particulate filter that is disposed downstream of the oxidation catalyst and that receives the exhaust gas from the internal combustion engine; and
   a control module that is communicatively coupled to a first fuel injector of the internal combustion engine and a second fuel injector that is external to the internal combustion engine, the control module configured to determine a regeneration mode and selectively control the first fuel injector and the second fuel injector based on the regeneration mode, wherein the control module is configured to determine a first regeneration mode when a soot level is above a threshold, wherein the control module is configured to determine a second regeneration mode when the soot level is below the threshold.

10. The system of claim 9, wherein the first fuel injector injects fuel into a cylinder of the internal combustion engine.

11. The system of claim 9, wherein the second fuel injector injects fuel into an exhaust gas stream from the internal combustion engine.

12. The system of claim 9, wherein the control module is configured to selectively control the first fuel injector and the second fuel injector based on a completion of one or more diagnostic algorithms.

13. The system of claim 9, wherein the control module is configured to control the first fuel injector and controls the second fuel injector based on a service regeneration request.

14. The system of claim 9, wherein the control module is configured to determine the regeneration mode based on a soot level.

15. The system of claim 14, wherein the soot level is an estimated level of particulate matter in the particulate filter.

* * * * *